C. A. B. HALVORSON, Jr.
METAL MIRROR.
APPLICATION FILED MAR. 9, 1920.

1,394,085.

Patented Oct. 18, 1921.
2 SHEETS—SHEET 1.

Inventor:
Cromwell A. B. Halvorson Jr.,
by
His Attorney.

C. A. B. HALVORSON, Jr.
METAL MIRROR.
APPLICATION FILED MAR. 9, 1920.
1,394,085.
Patented Oct. 18, 1921.
2 SHEETS—SHEET 2.
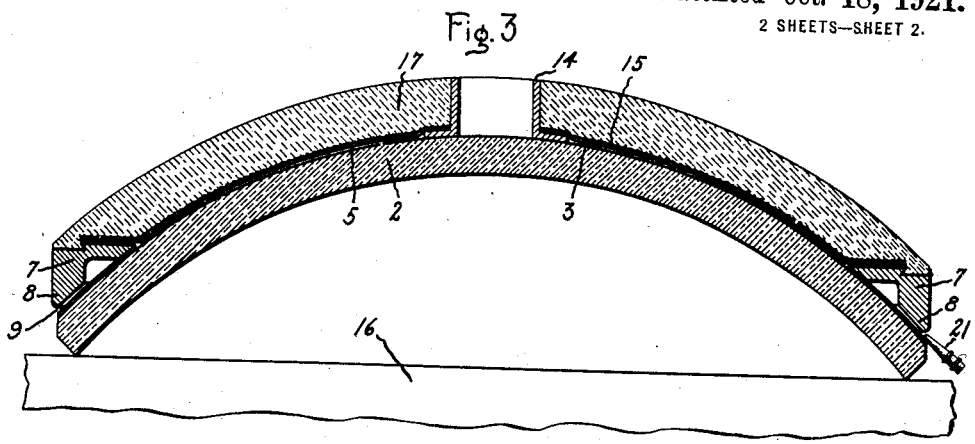
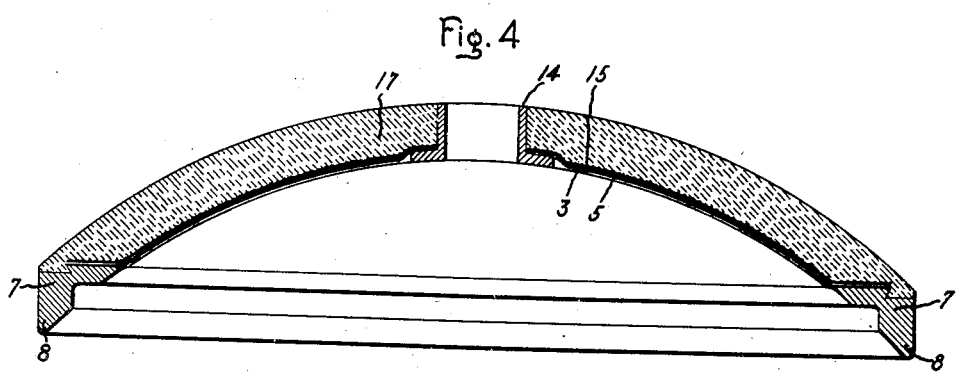
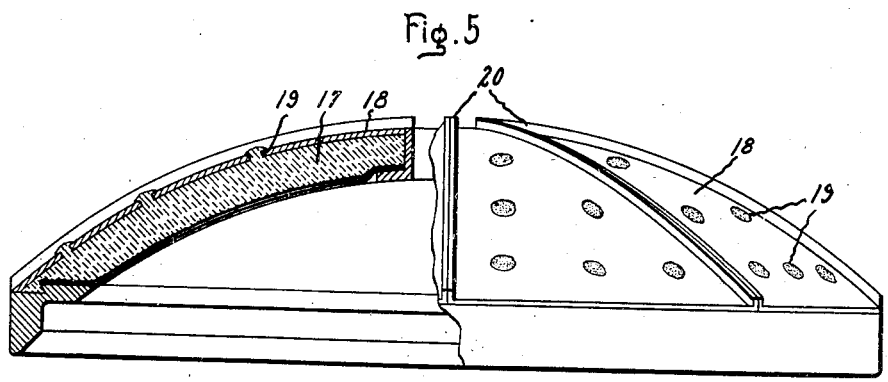
Inventor:
Cromwell A. B. Halvorson Jr.,
by Albert G. Davis
His Attorney.

UNITED STATES PATENT OFFICE.

CROMWELL A. B. HALVORSON, JR., OF LYNN, MASSACHUSETTS, ASSIGNOR TO GENERAL ELECTRIC COMPANY, A CORPORATION OF NEW YORK.

METAL MIRROR 1,394,085.  Specification of Letters Patent.  Patented Oct. 18, 1921.

Application filed March 9, 1920. Serial No. 364,537.

*To all whom it may concern:*

Be it known that I, CROMWELL A. B. HALVORSON, Jr., a citizen of the United States, residing at Lynn, county of Essex, State of Massachusetts, have invented new and useful Improvements in Metal Mirrors, of which the following is a specification.

My invention relates to metal mirrors and the process of making them. More specifically, it relates to silver metal mirrors as distinguished from those mirrors in which silver is also the reflecting medium but which is on the back of a body of glass. In the case of the usual silvered glass mirrors, the rays of light must pass through the glass before they strike the reflecting medium and the reflected rays also must pass through the glass before they issue into the field of illumination, which detracts from their efficiency. Furthermore, a glass mirror absorbs the heat rays from the source and is thereby easily cracked, particularly where arcs of high current, 150 amperes or over, are used, and such high currents are required with all of the larger mirrors, especially where they are used for searchlights.

In order to overcome these objections, I provide a mirror, in which silver, or its equivalent, is used as the reflecting medium which is reached directly by the light and heat rays from the source and which are reflected without the intervention of a body of glass. In accordance with the invention a protecting layer of copper or other suitable metal or metals is electrolytically deposited on the silver and the whole is reinforced by a cementitious plastic material, with or without the addition of a steel shell. A substantial rigid mirror is thus produced, which maintains its form and therefore prevents dislocation of its focus, and which may withstand the heat to which it may be subjected by the use of high intensity arcs, because, unlike glass, silver does not absorb heat rays to any considerable extent. Other features of superior utility are inherent in my invention as will be readily understood by those skilled in the art.

Figure 1:
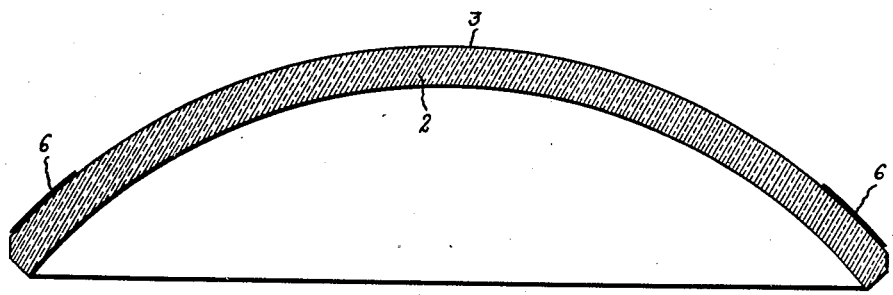
Figure 2:
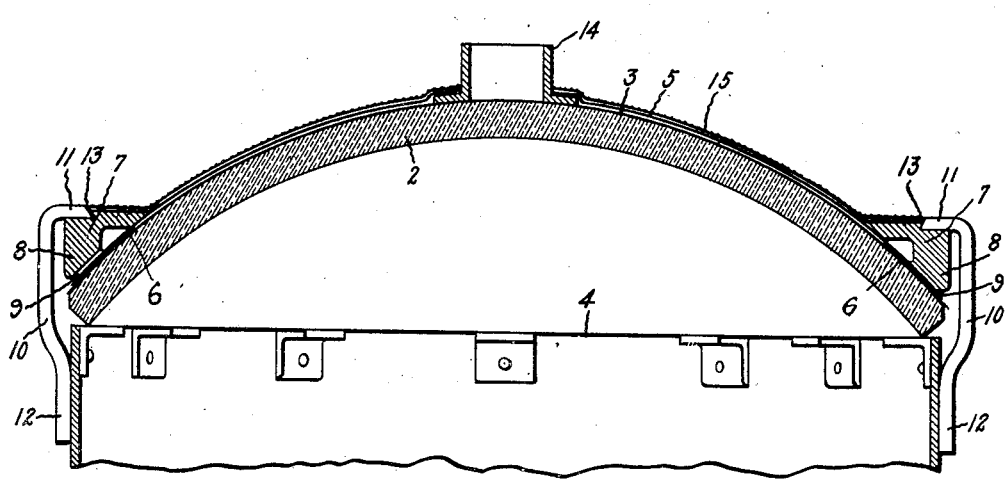

In the accompanying drawings illustrating my invention, Figure 1 is a cross sectional view of the mirror form, with the first steps in the process of manufacturing my mirror indicated thereon; Fig. 2 is a similar view to that shown in Fig. 1, showing the form secured to a holding frame and the process of manufacture more advanced; Fig. 3 is a similar view showing a completed mirror on the form, removed from the holding means shown in Fig. 2; Fig. 4 is a similar view of one type of a completed mirror removed from the form, and Fig. 5 is a view of a completed mirror, partly in section, provided with a reinforcing steel shell.

Referring to the drawings, 2 is a mirror form or pattern made preferably of plate glass, which has been molded to the desired form, and then ground and polished on its convex surface. The surface of the form, which determines the shape of the mirror, may be of any suitable or conventional type, such as parabolic, hyperbolic, or spheroidal, and I do not limit my invention to any particular type. Generally, mirrors used as reflectors are parabolic, and for purposes of illustration a parabolic mirror is shown in the drawings.

As the first step in the manufacture of my mirror, the convex surface of the form is thoroughly cleaned, and is then silvered either by a chemical deposit or otherwise.

In the practice of my invention I have found that while silver is the preferred reflecting surface there are other metals which can be used, and while in the following description I shall speak of silver as the reflecting surface it is to be understood that any efficiently reflecting metal could take its place. Also while I have found that silver, if such is used as the reflecting medium, can be comfortably deposited chemically, it may also be deposited by spraying it on the glass in a finely divided molten condition, and that there are still other ways of depositing a suitable reflecting medium onto the glass form. Consequently while in the following description I shall mainly speak of chemically deposited silver, it is to be understood that either the silver or other reflecting media need not be deposited chemically.

The deposited silver coating is indicated in the drawings by the numeral 3. After the deposit thereon of the silver 3, the form 2 is placed upon a spider 4 which is preferably made of conducting material. The silver coating 3 is now reinforced by an electrolytic deposit of silver 5. For this purpose electric contact to the chemical silver is required but a direct electrical connection to the initial chemical silver would be uncertain since this or any similar kinds of deposited silver coating is not very substantial, and the unavoidable movements of the connection might scratch off the silver. Therefore, in order to overcome this difficulty, I paint an annulus 6, of a suitable conducting substance, such as bronze lacquer, on the periphery of the chemical silver deposit 3, of a suitable width, to serve as a base on which the electrical connection may rest.

An angular edge ring 7, preferably of brass, is accurately placed with respect to the central point of the particular form upon the bronze lacquer annulus 6, which ring is designed to become a part of the completed mirror. Of the angular ring 7, the upper leg is, in the main, flat, and extends over the bronze lacquer annulus, resting with its chamfered underside upon the bronze lacquer. The other leg 8 of the angular ring is rather bulky, extending toward the edge of the form, without, however, touching the same, but leaving an open space 9 between itself and the form. The object of the space 9 will appear hereinafter. The ring 7 which bears against the bronze lacquer annulus 6 at its inner edge only is now securely clamped in position to make a firm contact with said annulus, by means of a suitable number of clamps 10, as shown in Fig. 2. The clamps 10 are provided with an elbow or hook 11 at one end and are adjustably secured at their opposite ends 12 in any suitable manner to the spider 4. The clamps 10 are made of an electrical conducting material and serve as conductors between the ring 7 and the spider 4. As shown in Fig. 2, the upper leg of the ring 7 is formed with an annular rabbet 13 at its upper outer edge, adapted to receive the hook portions 11 of the clamps 10. When the ring 7 has been thus firmly secured in position, the circular line where the innermost edge of the ring joins the adjacent portion of the bronze lacquer annulus, is additionally painted with bronze lacquer so as to avoid a possible gap between them, which the subsequently deposited electrolytic silver could not bridge. The remaining portions of the ring 7, the clamps 10 and the spider 4 are now covered with an insulating paint or with wax, to prevent the deposit of electrolytic silver thereon during the electro-silvering process. Electrical connections are now made between the clamps and the negative terminal of an electric circuit and like connections of the anodes of an electrolytic silvering bath with the positive terminal, and the entire structure as thus far described, is placed in a silver-plating tank. Electrolytic silver is thus deposited on the upper surface of the flat leg of ring 7, and on the whole surface of the chemical silver. The inner chamfered edge of ring 7, thus becomes electrolytically soldered to the silvering, both to the chemical and to the electrolytic deposits. The electrolytic action is permitted to continue until silver has been deposited to the desired thickness, about several ten-thousandths of an inch, whereupon the entire structure is removed from the silver-plating tank.

Those parts previously covered with insulated paint or wax are now dried and are, for greater security, covered with a thick layer of shellac. The proper electrical connections are now again made and the entire structure is placed in a copper-plating tank, where the electrolytic silver deposit is reinforced by a copper deposit 15, of the desired thickness. This copper reinforcement may be made either dense and smooth throughout, or it may be given a rather rough or cellular surface, by the proper choice of the current density employed, as is well understood by those skilled in the art. Instead of a deposit of copper, I may produce a deposit of any other suitable metal, notably of copper-nickel alloy or of nickel alone; these and other metals would be the equivalents of copper; or the reinforcement may be with alternate layers of various metals.

Frequently, and particularly in the cases of very large mirrors, it is desirable to provide the mirror with a central opening, because with that class of mirrors, the arc light electrodes and a portion of their regulating mechanism are preferably projected from the back of the mirror to their proper position within the mirror. In such cases, I use a central flanged ring 14 which is put in position before the copper deposit is made; it must be accurately centered and firmly held in position on the silver, the portion of the silver on which the flange of ring 14 rests having first been painted with bronze lacquer, to secure a good contact. The edge of the flange of the ring 14 and the adjacent portion of the silver is also painted with bronze lacquer to make a clean continuous joint of the copper deposit. The cylindrical part of the ring 14 is covered with a suitable insulating material, and on the outer surface friction tape may be used for this purpose, whereupon the electro-coppering is carried on in the manner above described, whereby the ring 14 is securely soldered, electrolytically, to the silver surface. When the central ring is used, the silver film within the same is removed after the mirror has been finished. I desire it to be understood, however, that my invention equally applies to mirrors with or without a central opening.

After the copper-plating process has continued until the desired thickness of copper, about 0.030 inch, has been deposited, the whole structure is removed from the tank and is thoroughly washed. The mirror form 2, with its several layers of silver and copper, which constitute the mirror proper, is removed from the spider 4, by loosening the clamps 10, and is placed upon a table 16 where all loose copper or other reinforcing metal is cleaned off the edge ring 7, and the friction tape, if such has been used, is removed from the ring 14.

The mirror is now ready for backing to give it the necessary rigidity to prevent any change in its form and consequent displacement of its focus. This backing, indicated by the numeral 17, is made of a suitable cement, Portland cement or plaster of Paris, or the like. Where a fine grain deposit of copper is used, I preferably introduce between the copper 15 and the backing 17, a suitable adhesive material, such as a coat of linseed oil, linseed oil mixed with ground pumice or oil paint with sand dusted thereon. These materials are here only mentioned by way of example, since numerous others may be used. In either case, whether the copper is made with a cellular surface, or is made smooth, a thin solution of the cement 17 is first applied, preferably with a stiff brush, thereby insuring either anchoring in the cells or tenacious adhesion of the cement to the smooth surface. The remainder of the coat of cement 17 is now applied with troweling in intimate contact with the priming coat described, to form a homogeneous construction. After the desired thickness, about ½ inch, has been applied, the surface is wiped clean and is carefully smoothed and gaged to a uniform thickness. The cement backing fills the undercut of the rabbet 13 and is thereby anchored to the ring 7. The cement is then allowed to dry, whereupon a suitable water-proof coating of paint is applied.

In another form of backing, I reduce the thickness of the cement 17 and reinforce the whole surface with a metal shell 18, about 0.035 inch in thickness. This shell may be of steel or aluminum or any other suitable metal; steel has proved to be particularly useful for this purpose. The steel shell 18 is formed of sectors, joined by flanges, and with numerous perforations 19, and the same is placed in position upon the cement promptly after the same has been applied, in order that the cement may ooze through the perforations and thus rivet the shell in place in a manner readily understood. The flanges, by which the sectors of the shell are joined, form radial stiffening ribs 20, as shown in Fig. 5, or the whole shell may be radially corrugated and thereby insure the requisite rigidity.

The mirror is now ready for removal from the form 2. This I may accomplish in one of several ways. For example, by the contraction of the cement in hardening, the whole mirror is more or less loosened from the form 2 and this loosening may be cautiously promoted by wedges gently forced in the space 9, and by other purely mechanical manipulations. In the preferred way of removing the mirror from the form, I use compressed air which is gently and gradually forced between the silver surface and the form. I carry out this process by inserting a series of nozzles 21, shown in Fig. 3, in the annular space 9, which nozzles are connected to a source of compressed air. The air pressure is gently applied until the mirror is free from the form. Finally, the face of the mirror, which is formed of the initial chemical deposit of silver 3, after having been thoroughly washed and dried, is coated with a suitable protective colorless lacquer, as a protection of the silver against the attacks of sulfur or other fumes.

The process and its resulting product so far described refer especially to mirrors of large size, and such mirrors, 60 inches in diameter, have been produced in this manner with excellent results. But when mirrors of a more moderate size are to be made the process may be considerably simplified and thereby, of course, cheapened. I have found that the electrolytic silver deposit upon the chemically deposited silver may in such cases be dispensed with, and also the electrolytic copper deposit may be omitted and the cement backing may be applied directly to the chemically deposited silver.

While I have described my invention in a specific manner, it should be understood that I do not limit my invention thereto, since various modifications thereof will suggest themselves to those skilled in the art without departing from the spirit of my invention.

What I claim as new and desire to secure by Letters Patent of the United States, is:

1. The process of producing a mirror of the desired shape which consists in chemically depositing silver on a form of highly polished glass, reinforcing the chemically deposited silver by an electrolytic deposit of silver and by an electrolytic backing of copper superimposed upon the electrolytic silver, stiffening the silver and copper deposits by applying a backing of cementitious plastic material to the copper, and removing the mirror from the form.

2. The process of making a mirror of the desired shape, which consists in chemically depositing silver on a form of highly polished glass, reinforcing the chemically deposited silver by an electrolytic deposit of silver, superimposing upon the silver an electrolytic deposit of copper and by the latter soldering a stiffening edge ring to the silver, backing the copper deposit by a layer of cement and removing the mirror thus formed from the form.

3. The process of producing a mirror of the desired shape which consists in chemically depositing silver on a form of highly polished glass, reinforcing the chemically deposited silver by an electrolytic deposit of silver and by an electrolytic backing of copper superimposed upon the electrolytic silver, stiffening the silver and copper deposits by a backing of cement reinforced by a steel shell, and removing the mirror from the form.

4. The process of producing a mirror of the desired shape which consists in chemically depositing silver on a form of highly polished glass, reinforcing the chemically deposited silver by an electrolytic deposit of silver and by an electrolytic backing of copper superimposed upon the electrolytic silver, stiffening the silver and copper deposits by a backing of cement, reinforcing the cement by pressing the plastic cement into perforations of a steel shell so as to form rivets holding the steel shell in intimate contact with the cement, and removing the mirror from the form.

5. The process of producing a mirror of the desired shape which consists in chemically depositing silver on a form of highly polished glass, reinforcing the chemically deposited silver by an electrolytic deposit of silver and by an electrolytic backing of copper superimposed upon the electrolytic silver, stiffening the silver and copper deposits by a backing of cementitious plastic material, and removing the mirror from the form by gently forcing compressed air between the silver deposit and the form.

6. A mirror composed of an opaque film of chemically deposited silver, the same having a reflecting surface which is the counterpart of an optically ground and polished mold, and a stiffening backing of cement.

7. A mirror, having an exposed reflecting surface of chemically deposited silver reinforced by an electrolytic deposit of silver and by an electrolytic backing of copper superimposed upon the electrolytic silver, and a stiffening ring electrolytically soldered to the silver and copper at the edge of the reflecting surface.

8. A mirror, having an exposed reflecting surface of chemically deposited silver reinforced by an electrolytic deposit of silver and by an electrolytic backing of copper superimposed upon the electrolytic silver, a stiffening ring electrolytically soldered to the silver and copper at the edge of the reflecting surface, and a backing of cement anchored to the edge ring.

9. A mirror, having an exposed reflecting surface of chemically deposited silver reinforced by an electrolytic deposit of silver and by an electrolytic backing of copper superimposed upon the electrolytic silver, a stiffening ring electrolytically soldered to the silver and copper at the edge of the reflecting surface, and a backing of cement anchored to the electrolytic deposit of copper and to the edge ring.

10. A mirror, having an exposed reflecting surface of chemically deposited silver reinforced by an electrolytic deposit of silver and by an electrolytic backing of copper superimposed upon the electrolytic silver, a stiffening ring electrolytically soldered to the silver and copper at the edge of the reflecting surface, said ring having a rabbeted outer edge, and a backing of cement interlocked with said rabbeted edge.

11. A mirror, having an exposed reflecting surface of chemically deposited silver reinforced by an electrolytic deposit of silver and by an electrolytic backing of copper superimposed upon the electrolytic silver, a stiffening ring electrolytically soldered to the silver and copper at the edge of the reflecting surface, a central opening in the reflecting surface and a stiffening central ring around the central opening electrolytically soldered to the silver and copper.

12. A mirror, having an exposed reflecting surface of chemically deposited silver reinforced by an electrolytic deposit of silver and by an electrolytic backing of copper superimposed upon the electrolytic silver, a stiffening ring electrolytically soldered to the silver and copper at the edge of the reflecting surface, a central opening in the reflecting surface, a stiffening central ring around the central opening electrolytically soldered to the silver and copper, and a backing of cement over the copper anchored to the edge ring.

13. A mirror, having an exposed reflecting surface of chemically deposited silver reinforced by an electrolytic deposit of silver and by an electrolytic backing of copper superimposed upon the electrolytic silver, a stiffening ring electrolytically soldered to the silver and copper at the edge of the reflecting surface, a backing of cement anchored to the edge ring, and a metal shell reinforcement self-riveted to the cement.

14. A mirror, having an exposed reflecting surface of chemically deposited silver reinforced by an electrolytic deposit of silver and by an electrolytic backing of copper superimposed upon the electrolytic silver, a stiffening ring electrolytically soldered to the silver and copper at the edge of the reflecting surface, a backing of cement anchored to the edge ring, and a metal shell formed with perforations through which the cement backing material projects and thereby forms rivets holding the metal shell in intimate contact with the cement.

In witness whereof, I have hereunto set my hand this fourth day of March, 1920.

CROMWELL A. B. HALVORSON, Jr.